United States Patent [19]

Onishi et al.

[11] Patent Number: 4,864,992
[45] Date of Patent: Sep. 12, 1989

[54] PNEUMATIC CONSTANT-VELOCITY RUNNING APPARATUS

[75] Inventors: Masayoshi Onishi; Takeshi Yasukawa, both of Hyogo, Japan

[73] Assignee: Mitsubishi Denki Kabushiki Kaisha, Tokyo, Japan

[21] Appl. No.: 116,306

[22] Filed: Nov. 4, 1987

[30] Foreign Application Priority Data

Nov. 4, 1986 [JP] Japan .................. 61-262384
Nov. 14, 1986 [JP] Japan .................. 61-272149

[51] Int. Cl.$^4$ .............................................. F02D 11/08
[52] U.S. Cl. ......................... 123/360; 91/454; 91/459; 180/177
[58] Field of Search .............. 123/360, 361, 339, 647, 123/198 R, 352; 180/177; 91/454, 459

[56] References Cited

U.S. PATENT DOCUMENTS 4,559,864 12/1985 Sakakibara et al. ............. 123/360

FOREIGN PATENT DOCUMENTS 40224 3/1980 Japan ................................. 123/647
64158 5/1980 Japan ................................. 123/647

Primary Examiner—Tony M. Argenbright
Attorney, Agent, or Firm—Sughrue, Mion, Zinn, Macpeak & Seas

[57] ABSTRACT

A pneumatic constant-velocity running apparatus employing a diaphragm type actuator in which a portion or the whole of a control circuit for the actuator is made of a hybrid IC and the hybrid IC portion with a protector is fixedly mounted onto the outer surface of an housing of the actuator. The apparatus is made compact and further be remarkably improved in an operation accuracy and in noise-proof property as well as in heat radiating property.

2 Claims, 5 Drawing Sheets

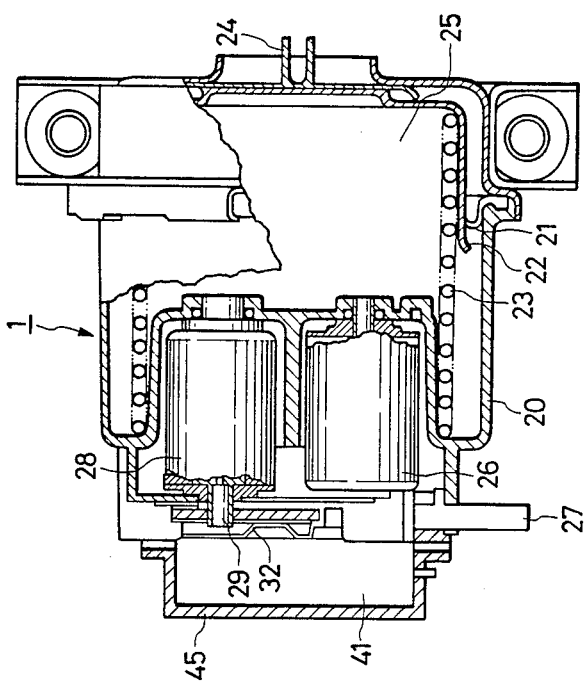
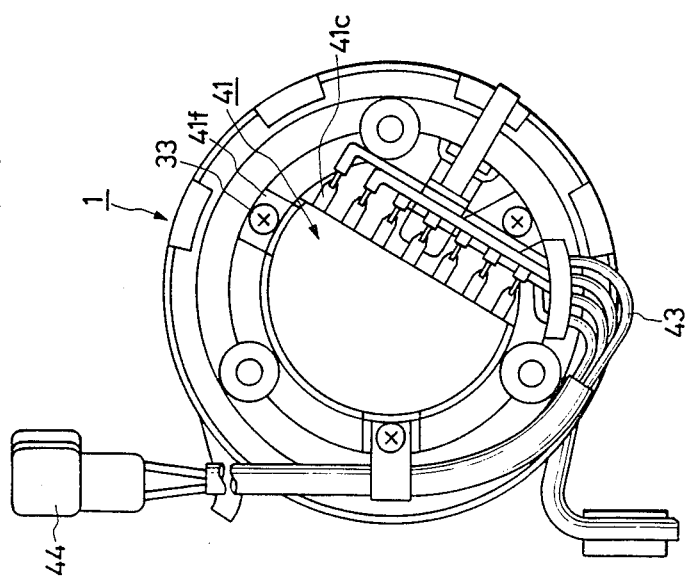
FIG. 6(A)
FIG. 6(B)

PNEUMATIC CONSTANT-VELOCITY RUNNING APPARATUS

BACKGROUND OF THE INVENTION

1. Field of the Invention

The present invention relates to a pneumatic constant-velocity running apparatus employing a diaphragm type actuator, in which a portion or the whole of a control circuit for the actuator is formed as a hybrid IC and the hybrid IC portion is fixedly mounted outside of an housing of the actuator so as to improve the control system accuracy and in noise proof property as well as in heat radiating property. Further, the apparatus can be reduced in size.

2. Description of the Prior Art

Heretofore, in a constant-velocity running apparatus employing a diaphragm type actuator of the type as described above, it is general that an actuator and a control circuit are provided separately from each other, and are separately mounted on a vehicle as a driving device and as a controller respectively.

FIG. 1 shows an example of the conventional apparatus. In FIG. 1, a reference numeral 1 designates a diaphragm type actuator; 2 and 3, wires; 4, an accelerator pedal; 5a and 5b, throttle links; 6, a throttle valve; 7, an engine; 8, a speed meter; 9, a control unit (control circuit) and 10, an operation panel.

In the foregoing arrangement, the throttle valve 6 is operated by the operation of the accelerator pedal 4 through the wire 3 and the throttle link 5b. The diaphragm type actuator 1 operates the throttle valve 6 through the wire 2 and the throttle link 5a independently of the operation of the accelerator pedal 4. In response to a feed-back signal from the speed meter 8, the control unit 9 applies a command to the diaphragm type actuator 1 so as to set the vehicle velocity at a predetermined constant value.

FIGS. 2A and 2B an arrangement of the diaphragm type actuator 1 shown in FIG. 1. In FIGS. 2A and 2B, a reference numeral 20 designates an actuator housing; 21, a diaphragm attached on the inner circumferential surface of the actuator housing 20; 22, a diaphragm holder supported by the diaphragm 21 and provided at the inside front portion of the actuator housing 20; 23, a spring for urging the diaphragm holder 22 forwards and outwards from the actuator hosing 20; 24, a wire holder provided on the central outside of the diaphragm holder 22; 25, a diaphragm chamber formed in the actuator housing 20; 26, an exhaust solenoid valve for exhausting air in the diaphragm chamber 25 and 27, a negative-pressure port of the exhaust solenoid 26 connected to an engine manifold portion, an external vacuum pump and the like. Further, a reference numeral 28 designates a suction solenoid valve for feeding air into the diaphragm chamber 25; 29, an atmospheric airport of the suction solenoid valve 28 opened in the atmosphere; 30, externally led out wires connected to the exhaust solenoid 26 and the suction solenoid 28; 31, an externally connecting connector connected to the externally led out wires 30; 32, a housing plate of the housing 20 provided at the rear end portion of the actuator housing 20 and 33, screws for fixing the housing plate 32 to the actuator housing 20.

The operation of the thus arranged actuator will be described hereunder. When constant-velocity running control is set, in response to a deviation of the vehicle velocity, the exhaust solenoid valve 26 is duty-cycle controlled so as to increase the rate of the solenoid ON-time. On the contrary, the suction solenoid valve 26 is duty-cycle controlled in inverse proportion to the deviation of the vehicle velocity so as to reduce the rate of the solenoid velocity ON-time. The foregoing operation has been described as to the case in which an actual vehicle velocity is lower than a set value. On the contrary, the exhaust and suction solenoids 26 and 28 are respectively reversely controlled. When the ON-time of the exhaust solenoid 26 is larger that of the suction solenoid 28, the air pressure is the diaphragm chamber 25 becomes lower than the atmospheric pressure, so that the diaphragm holder 22 is moved in the direction of an arrow A against the force of the spring 23 by the pressure difference between the pressure in the diaphragm chamber 25 and the atmospheric pressure and by the operation of the diaphragm 21. Accordingly, the wire 2 shown in FIG. 1 and held by the wire holder 24 is pulled. If the ON-time of the suction solenoid 28 is longer, the operation is effected reversely.

As a result, the negative pressure in the diaphragm chamber 25 of the actuator 1 is controlled so that the actuator 1 is stroke-controlled such that the duty-cycle control of the exhaust and suction solenoids 26 and 28 are stopped when the deviation of vehicle velocity becomes zero and the stroke in that state is maintained to thereby attain the constant-velocity running state. When a deviation occurs in the vehicle velocity again in the constant-velocity running controlling state, the exhaust and suction solenoid valves 26 and 28 starts to be subjected to duty-cycle control in order to eliminate the deviation in the vehicle velocity.

FIG. 3(A) is a block diagram showing the control circuit 9, etc. of FIG. 2. in FIG. 3(A), a microcomputer 9a, a power source circuit 9b, an input circuit 9c, a reset circuit 9d, an output circuit 9e and a fail-safe circuit 9f for keeping the safety of the output circuit 9e constitute the control circuit 9. A reference numeral 10a designates a main switch for the power source circuit 9b; 10b, a control switch; 10, a cancel switch for cancelling a constant-velocity setting and 34, a speed sensor for detecting the vehicle velocity. An output terminal of the output circuit 9e is connected to input terminals of the exhaust and suction solenoid valve 26 and 28 and a coil of, for example, a external vacuum pump (not shown) connected to the exhaust solenoid valve 26 [see the reference numeral 27a in FIG. 3(B)].

FIG. 3(B) is a further detailed circuit diagram showing the output circuit 9e, the fail-safe circuit 9f, and so on. In FIG. 3(B), a reference numeral 35 designates a first transistor having an emitter grounded and a reference numeral 36 designates a second transistor having an emitter connected to a power source so that the level of the output of the transistor 36 is made "H" or "L" in response to the on or off state of the first transistor 35. Reference numerals 37a, 37b, and 37c designate NOR gates, and 38a, 38b, and 38c designate pull-up resistors for pulling up respective connection lines which connect one-line terminals of the respective NOR gates 37a through 37c to the microcomputer 9a. The other input terminals of the respective NOR gates 37a through 37c are commonly connected to the output side of, that is, the collector of the transistor 36. Reference numerals 39a, 39b, and 39c designate current limiting resistors which connect the respective output terminals of the NOR gates 37a through 37c to the respective bases of emittergrounded transistors 40a, 40b and 40c, respectively. The respective collectors of the transistors 40a, 40b and 40c are commonly connected to a power source Vcc respectively through a coil 27a of the external vacuum pump, a coil 26a of the exhaust solenoid valve 26, and a coil 28a of the suction solenoid valve 28. A reference symbols $R_1$ through $R_3$ designate resistors, and $ZD_1$ and $ZD_3$ designate Zener diodes, respectively.

The operation of the output circuit 9, the fail-safe circuit 9f, and so on will be described hereunder. When the first transistor 35 is in the off-state, the second transistor 36 is also in the off-state, so that the one input of each of the NOR gates 37a through 37c is in the "L" level. Accordingly, the outputs of the NOR gates 37a through 37c depend on a control output of the microcomputer 9a. Each of the three transistors 40a through 40e is turned on or off in accordance with the "L" or "H" level of the microcomputer 9a respectively, and the coils 27a, 26a, and 28a are turned on/off in accordance with the on/off state of the transistors 40a through 40c respectively.

Upon generation of abnormality, when the first transistor 35 is turned on, the second transistor is also turned on, so that a signal in the "H" level is applied to the one input terminal of each of the NOR gates 37a through 37c. Accordingly, the respective outputs of the NOR gates 37a through 37c are always in the "L" level, the transistors 40a through 40c are always in the off-state, and the coils 26a, 27a, and 28a are in the off-state. That is, fail-safe is attained.

Being arranged in such a manner as described above, the conventional pneumatic constant-velocity running apparatus has problems as follows. The drive control portion of the exhaust and the suction solenoid valves 26 and 28 is incorporated in the separately provided control unit 9. Accordingly, the diaphragm actuator 1 is connected to the control unit 9 through the connector 31, the externally led-out wires 30, and a intermediate harness, and the distance between the diaphragm actuator 1 and the control unit 9 differs with the kind of car. If the length of the harness becomes longer, the resistance and the inductance of the exhaust and suction solenoid valves 26 and 28 increase to make the sucking force property as well as the response property of the exhaust and suction solenoid valves 26 and 28 change. Further, since the lengths of the harnesses differ with cars, even diaphragm type actuators having the same performance may vary in properties with cars on which the pneumatic driving apparatuses are mounted. Further, if the length of the harness becomes so long, not only the noise-proof property becomes poor but the connectors for connecting the diaphragm type actuator 1 and the control unit 9 with each other are increased in number so that the probability of faulty connection increases to deteriorate the reliability. Furthermore, the control unit 9 is provided separately from the actuator 1 so that the occupying area therefor increases inconventionally in view of reduction in size of the apparatus. Further, since the driving portion of the control unit 9 for drive-controlling the actuator generates heat, it is necessary to provide means such as a heat sink for radiating the heat resulting in making the control device 9 larger and cause a problem of limitation in mounting area of the control unit 9. Furthermore, generally, the control accuracy of the control unit 9 is determined on the basis of the total variations in the various elements of the control unit 9 so as to grasp the respective gains of the car and the actuator 1 as representative values, and the thus obtained representative values are adjusted to an average gain value which relatively matches the representative values to thereby complete the adjustment. As a result, it could not be avoided that there happens a combination of an actuator 1 and a car which is inconvenient in function due to variations in actuators as well as in cars, resulting in poor reputation as a claim in market.

SUMMARY OF THE INVENTION

The present invention is accomplished to eliminate the problems as described above and an object thereof is to provide a pneumatic constant-vehicle running apparatus which can be made small in size, which can be reduced in cost which can be made high in accuracy, and which can be improved in heat radiation property, in noise-proof property, and in reliability.

In the pneumatic constant-velocity running apparatus according to the present invention, a portion or the whole of the control circuit is made to be a hybrid IC, so that the control circuit is miniaturized. Further, the hybrid IC portion is attached onto an outer surface of the diaphragm actuator housing, so that a housing plate attached to the actuator housing functions as a heat sink, and the wiring capacitance between the diaphragm actuator and the control circuit is reduced. Furthermore, the diaphragm actuator and a portion or the whole of the control circuit are integrated with each other, so that setting of the respective gains of the actuator and the control circuit can be attained.

BRIEF DESCRIPTION OF THE DRAWINGS

In the accompanying drawings:

FIG. 6(A) is a front view of a diaphragm type actuator mounting the semiconductor portion 41 from which a casing is removed;

FIG. 6(B) is a vertical cross-section of FIG. 6(A);

DETAILED DESCRIPTION OF THE PREFERRED EMBODIMENTS

Figure 1:
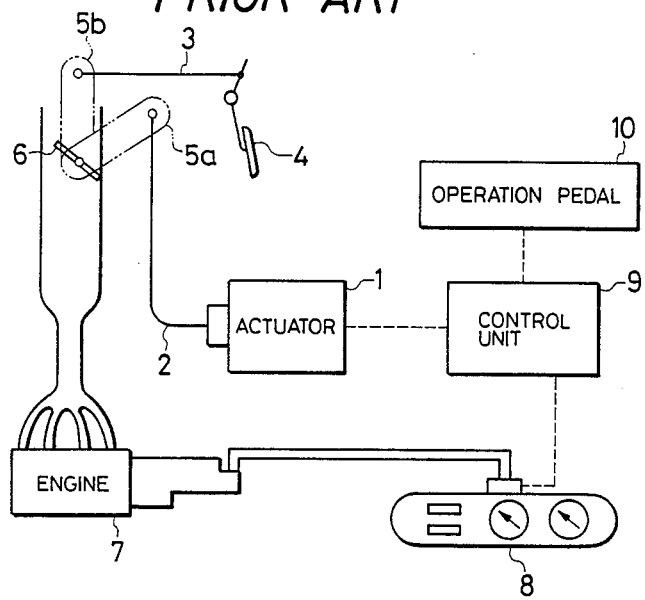
FIG. 1 is a diagram showing the arrangement of the conventional pneumatic constant-velocity running apparatus.

Referring to the drawings, preferred embodiments of the present invention will be described hereunder.

Figure 4:
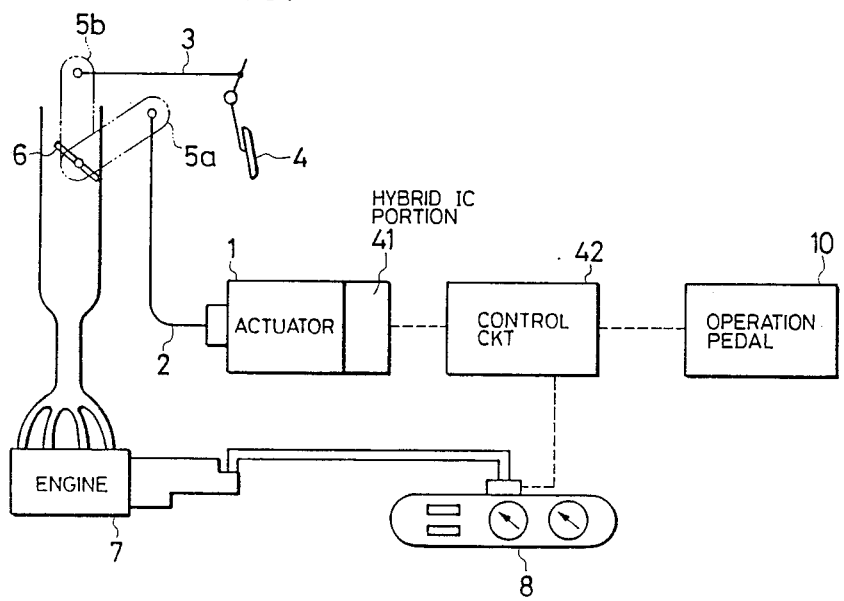
FIG. 4 is a diagram showing the arrangement of an embodiment of the pneumatic constant-velocity running apparatus according to the present invention.
Figure 3A:
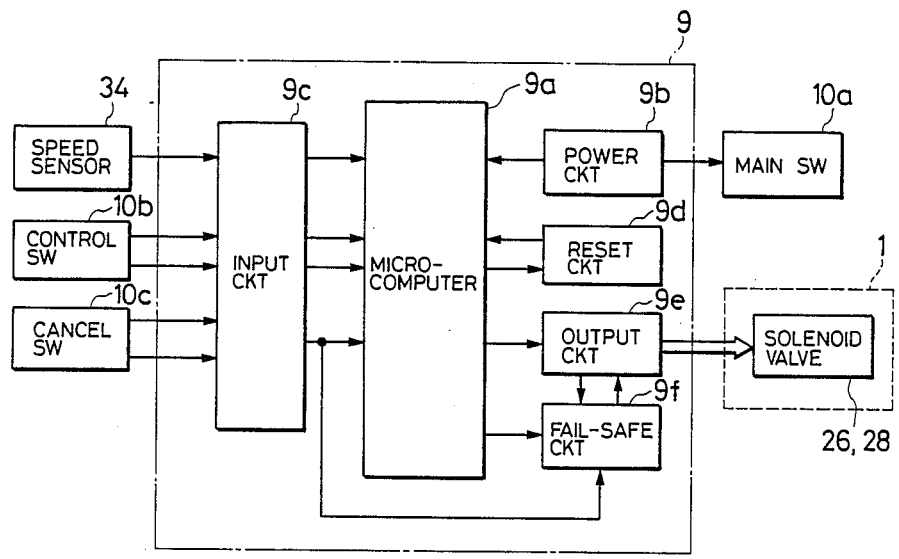
FIG. 3(A) and 3(B) are diagrams showing an embodiment of a control circuit for the actuator shown in FIGS. 2(A) and 2(B)
Figure 3B:
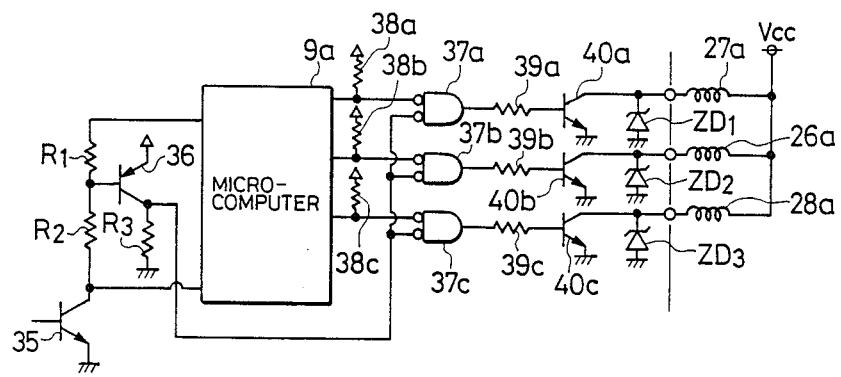

In the embodiment as shown in FIG. 4, a part of a diaphragm type actuator control circuit, that is, the output circuit 9e and the fail-safe circuit 9f shown in FIG. 3(A) and FIG. 3(B) for instance, is made to be in the form of a hybrid IC portion 41, and the hybrid IC portion 41 is attached onto an outer surface of a diaphragm type actuator 1, and the remaining portion 42 of the control circuit is made to be in the form of a control unit. The hybrid IC portion 41 and the remaining portion 42 of the control circuit correspond to a functionally corresponding portions of the control circuit 9 shown in FIG. 3(A). The arrangement of the other portions is the same as those of the conventional apparatus.

Figure 5A:
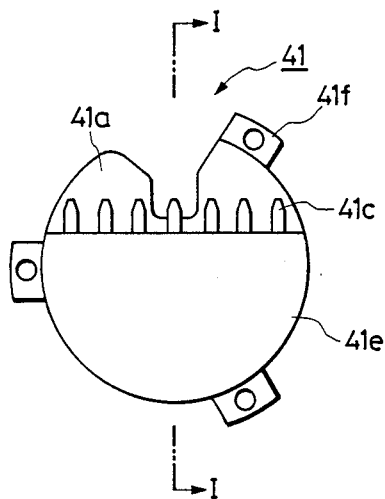
FIG. 5(A) is a front view of a semiconductor portion 41 shown in FIG. 4.
Figure 5B:
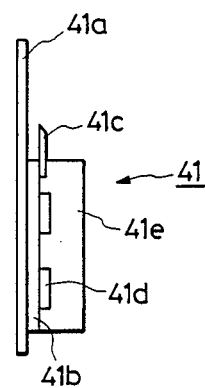
FIG. 5(B) is a cross-section taken on a line V—V of FIG. 5(A)

FIGS. 5(A) and 5(B) show the hybrid IC portion 41 in detail. In the figures, a reference numeral 41a designates a heat sink, a portion of which is formed as an attaching plate 41f. An insulating substrate 41b such as a ceramic plate carries externally led-out pins 41c and semiconductor pellets including control circuit elements. Reference numeral 41e designates an exterior mold. The exterior mold is formed with soft molding materials such as a silicone rubber, a silicone rubber powders and the like under low temperature and low pressure in order to eliminate undesired stress to the semiconductor pellets.

Figure 2B:
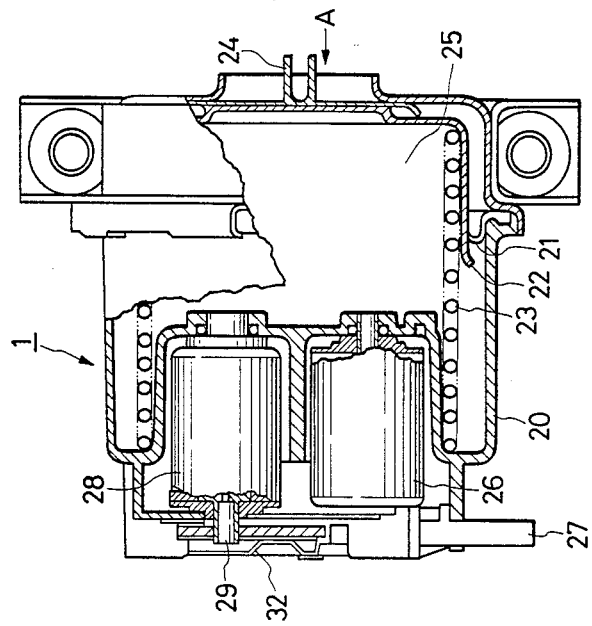
FIGS. 2(A) and 2(B) are diagrams showing the arrangement of the conventional diaphragm type actuator.
Figure 2A:
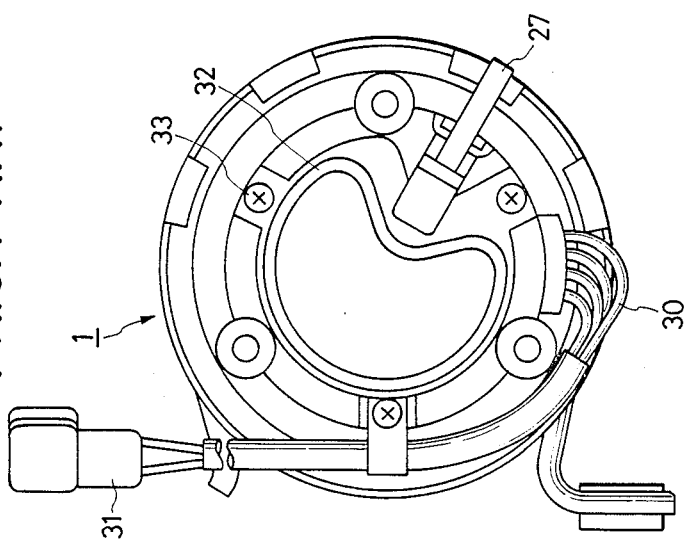

FIG. 6(A) is a front view of the diaphragm type actuator in which a casing member 45 is removed, and FIG. 6(B) is a vertical cross-section of the diaphragm type actuator in which the casing member 45 is attached. In the figures, the portions same as those in the conventional apparatus bear the same or corresponding reference numerals in FIGS. 2(A) and 2(B), and therefore the description as to those portions will be omitted here. In the figures, the hybrid IC portion 41 is fixed by the screws 33 to the rear end outer surface portion of the actuator housing 20 through the attaching plate 41f. The externally led-out pins 41c are partly connected to the coils [26a and 28a in FIG. 3(B)] of the exhaust and the suction solenoid valves 26 and 28, and so on. A reference numeral 43 designates externally led-out wires connected to the remaining part of the externally led-out pins 41c and 44 designates a connector connected to the externally led out wires 43 for connecting the latter to the remaining portion 42 of the control circuit shown in FIG. 4. The casing member 45 holds the attaching plate 41f between the housing plate 32 and the casing member 45 and the casing member 45 serves as a cover for the hybrid IC portion 41 so as to protect the same. In order to fix the casing member 45, for example, the screws 33 may be commonly used. Although the output circuit 9e and the fail-safe circuit 9f in the control circuit 9 shown in FIG. 3 are made to be in the form of a hybrid IC in the foregoing embodiment, various modifications are possible, in which only the output circuit 9e is made to be a hybrid IC, the whole of the control circuit 9 is made to be a hybrid IC, and so on. It will do to employ the optimum combination for the system conditions.

Figure 7A:
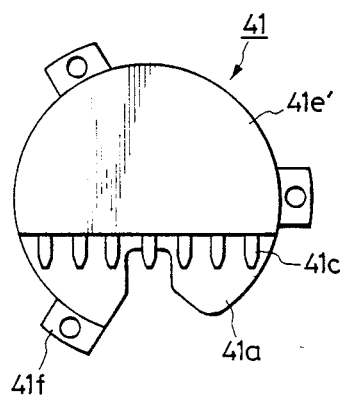
FIG. 7(A) is a front view of another embodiment of the semiconductor device 41.
Figure 7B:
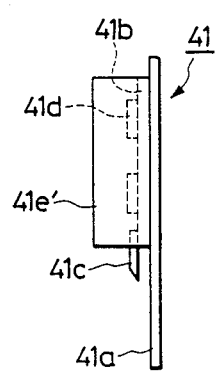
FIG. 7(B) is a vertical cross-section of FIG. 7(A).

The second embodiment of the IC portion 41 is shown in FIGS. 7(A) and 7(B).

The reference 41d designates semiconductor pellets coupled to wirings on an insulating substrate 41b such as a ceramic plate, 41c designates a led-out terminal for the wirings, and 41a designates a heat sink made, for example, of an aluminum plate on which the ceramic plate 41b is fixed, a part of the heat sink 41a being formed to serve as an attaching plate 41f. The reference numeral 41e' designates a resin molding member for sealing the semiconductor pellet 41d. The resin molding member is formed in the same manner as in the first embodiment of FIGS. 5(A) and 5(B). Further, the molding member may be formed by the steps of providing a casing member over the insulating plate 41b bearing the semiconductor pellets 41d and the led-out terminals 41c and pouring a silicone gel into the casing member to form the molding member.

The IC portion 41 shown in FIGS. 7(A) and 7(B) is attached to the housing plate 32 as shown in FIG. 6(B) and a metal casing member 45 is provided to protect the IC portion 41 in such a manner that the metal casing member 45 is fixed to the housing plate 32 of the frame body 20 together with the metal casing member 45 by an attachment screw 33 as shown in FIG. 6(A).

In the apparatus in the above-mentioned embodiment, heat generated in the semiconductor apparatus 41 is radiated out of the housing plate 32 and the outer frame 45 through the heat sink 41a, so that heat-radiation property can be extremely improved. Further, the wiring for connecting the electromagnetic valves 26 and 28 the driving control circuit can be extremely shortened, so that variations in performance (sucking force and responsibility) of the electromagnetic valves 26 and 28 can be prevented from occurring unlike in the conventional device and that the wiring capacitance can be made smaller to thereby improve the noise-proof property.

As described above, according to the present invention, a portion or the whole of the control circuit of the diaphragm type actuator is made to be a hybrid IC and the hybrid IC portion is mounted on the outer surface of the housing of the diaphragm type actuator with a protector, so that there are such effects as follows: (1) Being made in the form of a hybrid IC, the control circuit can be made smaller in size; (2) The housing plate, or the like, functions as heat sink so as to improve the heat-radiation and heat-resistance properties; (3) The wiring capacitance (the number of the wires x the length of the same) between the exhaust and suction solenoid valves and the control circuit can be reduced to thereby improve the noise-proof property and the reliability, and the cost can be lowered; (4) When the apparatus is mounted on a vehicle, a highly accurate gain can be obtained as a system by setting the respective gains of the actuator and the control circuit; and (5) It is possible to obtain an apparatus having a large degree of freedom in mounting the apparatus on a vehicle.

What is claimed is:

1. A pneumatic constant-velocity running apparatus comprising: a diaphragm type actuator having a housing with an outer surface for driving an engine, a control circuit for controlling said diaphragm type actuator so as to cause said engine to run at a constant-velocity, at least a portion of said control circuit being formed as a semiconductor device, said semiconductor device comprising: a heat sink including a portion serving as an attaching plate to the outer surface of said housing of said diaphragm type actuator, a hybrid IC portion constituting the portion of said control circuit; an insulating plate carrying said hybrid IC portion thereon, said insulating plate being attached to said heat sink and an exterior mold molded about said hybrid IC portion and sealing said hybrid IC portion, and a metal casing member overlying said attaching plate and commonly attached to the outer surface of said housing, together with said attaching plate permitting the control circuit to be modified in accordance with the variation of gain of the actuator to effect a highly accurate control system for controlling said actuator under driving pulse duty.

2. A pneumatic constant-velocity running apparatus as defined in claim 1 wherein said exterior mold is a resin mold member.

* * * * *